United States Patent [19]

Slusher

[11] 4,062,372
[45] Dec. 13, 1977

[54] ARTICULATED WALKING CANE

[75] Inventor: John G. Slusher, Jackson Heights, N.Y.

[73] Assignee: The Raymond Lee Organization, Inc., New York, N.Y. ; a part interest

[21] Appl. No.: 700,867

[22] Filed: June 29, 1976

[51] Int. Cl.² .............................................. F16M 13/08
[52] U.S. Cl. ....................................... 135/66; 135/67; 135/75; 248/155.3
[58] Field of Search ........................ 248/96, 155–155.3, 248/169, 171; 135/65, 66, 67, 75

[56] References Cited

U.S. PATENT DOCUMENTS

| 181,802 | 9/1876 | Smith et al. | 248/155.3 |
|---|---|---|---|
| 464,999 | 12/1891 | Schneider | 248/155 |
| 1,089,295 | 3/1914 | Vallier | 248/155 |
| 2,127,976 | 8/1938 | K-Howat | 135/66 |
| 3,321,164 | 5/1967 | Petrick | 248/171 |

FOREIGN PATENT DOCUMENTS

| 824,021 | 9/1969 | Canada | 248/169 |
|---|---|---|---|
| 2,255,881 | 2/1974 | France | 135/66 |
| 1,447,261 | 1/1969 | Germany | 248/169 |
| 52,083 | 5/1920 | Sweden | 248/171 |

Primary Examiner—Werner H. Schroeder
Assistant Examiner—Conrad L. Berman
Attorney, Agent, or Firm—Howard I. Podell

[57] ABSTRACT

A walking cane fitted with three articulated struts that are each linked to a slidable spring-biased piston in the foot of the cane, and joined together so as to extend away from the foot of the cane when the piston is pushed against the ground and upwards into the cane, with the extended struts acting to support the cane in tripod fashion. Release of downward pressure against the piston permits the spring to slide the piston downwards and retract the three struts.

2 Claims, 2 Drawing Figures

ARTICULATED WALKING CANE

SUMMARY OF THE INVENTION

My invention is a walking cane fitted with three articulated struts that are each linked to a slidable spring-biased piston in the foot of the cane, and joined together so as to extend away from the foot of the cane when the piston is pushed against the ground and upwards into the cane, with the extended struts acting to support the cane in tripod fashion. Release of downward pressure against the piston permits the spring to slide the piston downwards and retract the three struts.

BRIEF DESCRIPTION OF THE DRAWINGS

The objects and features of the invention may be understood with reference to the following detailed description of an illustrative embodiment of the invention, taken together with the accompanying drawings in which.

Figure 1:
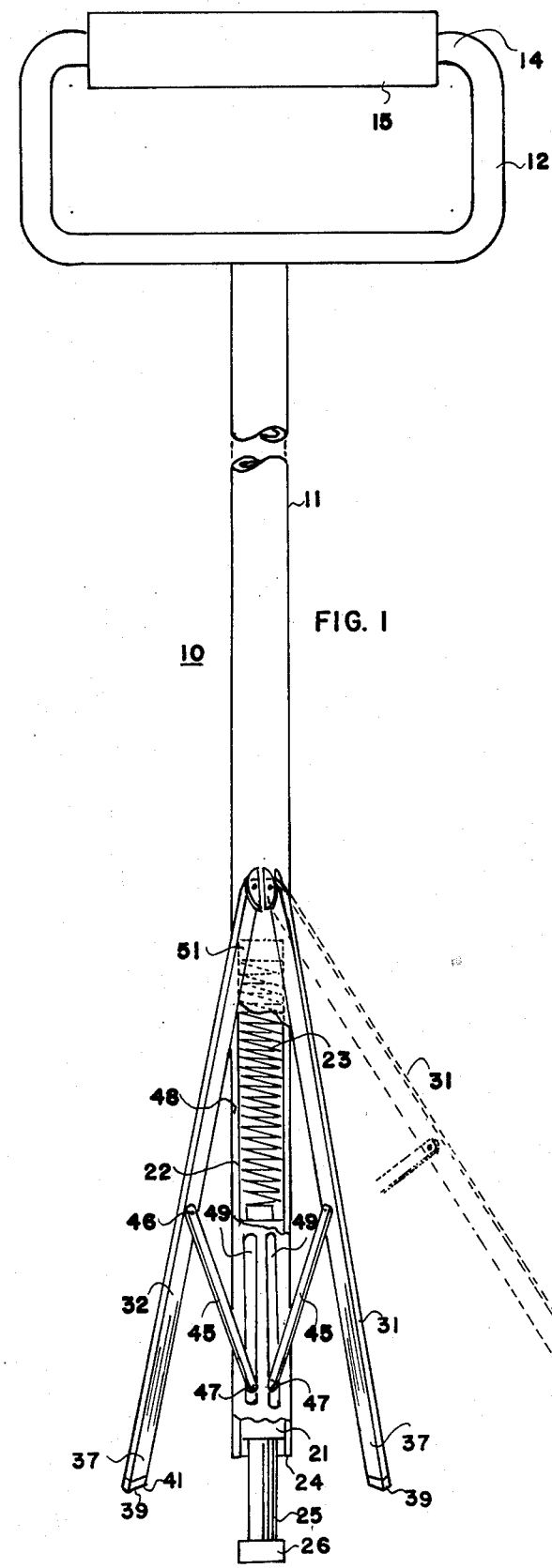
FIG. 1 is an elevation view of the invention.
Figure 2:
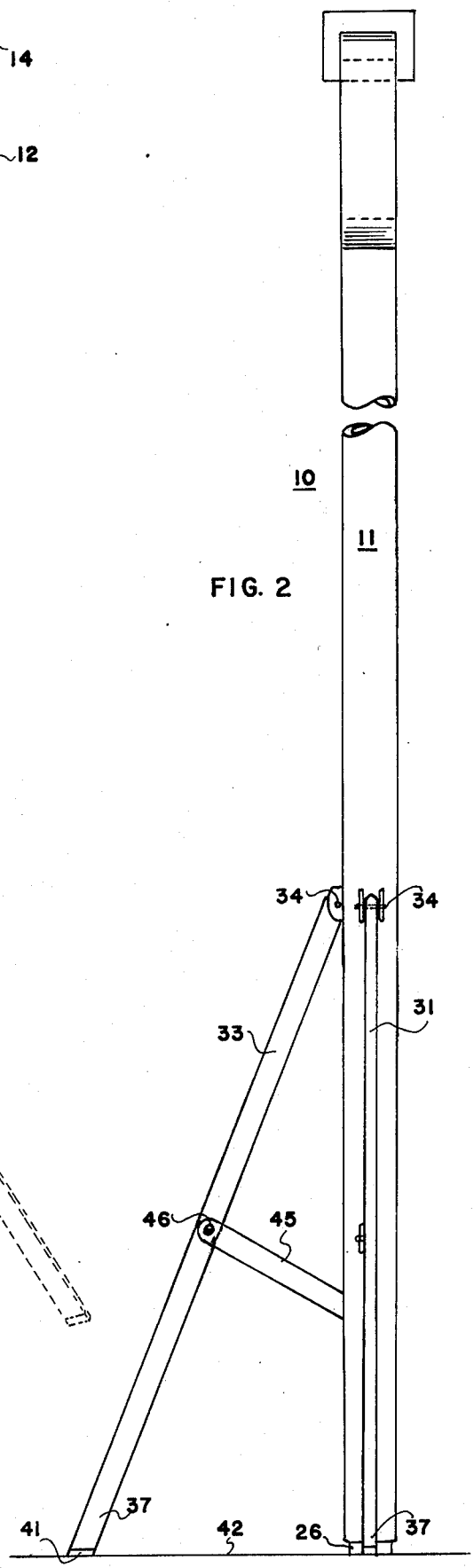
FIG. 2 is a side view of the invention.

DESCRIPTION OF THE PREFERRED EMBODIMENT:

Turning now descriptively to the drawings, in which similar reference characters denote similar elements throughout the several views, FIGS. 1-2 illustrate the articulated walking cane 10 formed of a primary hollow tube 11 joined at its upward end to a handle 12. Handle 12 is in the form of a closed rectangular shaped ring and enclosed along its upper section 14 by a resilient tube 15.

A piston 21 is slidably mounted inside the lower section 22 of tube 11, and biased by a compression spring 23 inside tube 11 to project beyond the foot end 24 of tube 11, with piston 21 fitted to a leg section 25 terminating in a rubber tip 26 that projects beyond the foot end 24 of tube 11.

Three struts 31, 32 and 33 are each individually pivotably mounted to tube 11 by pins 34 to rotate from first position, shown in solid lines in FIG. 1 adjacent to tube 11, to a second position, shown by dash lines in FIG. 1 and by solid lines in FIG.2 in which the foot end 37 of each strut 31-33 extends away from the foot end 24 of tube 11, with struts 31-mounted at positions on tube 11 so that in the said first position, the foot end 37 of each strut 31-33 extends beyond the foot end 24 of tube 11, with foot end leg section 25 of piston 21 extending beyond said foot ends 37 of the struts 31-33. Each foot end 37 of a strut 31-33 is fitted with a rubber tip 39, with the bottom surface 41 of each tip 39 shaped along a plane parallel to the ground surface 42 contacted by all three struts 31-33 and piston leg tip 26 in the extended position of the struts shown in FIG. 2.

An individual brace 45 is pivotably joined to each strut and to piston 21 by pins 46 and 47 with each brace 45 passing through a longitudinal slot 49 in tube wall 48 so that axial motion of piston 21 results in angular rotation of each strut 31-33 about its mounting pin 34.

Spring 23 is fixed inside of tube 11 by a bolted stop member 51.

Struts 31-33 are oriented to tube 11 so that struts 31 and 32 extend in a common plane, with strut 33 extending in a plane perpendicular to that of 31-33.

In use, struts 31-33 retract to the sides of tube 11 except when the user applies downward pressure on handle 12 to cause piston 21 to retract upwards in tube 11, with such retraction of piston 21 causing struts 31-33 to extend away from tube 11 to provide a multi-point positive support to the tube 11 against the ground 42.

While the invention has been described in terms of a cane, it is readily seen that the invention may be utilized as a crutch or other orthopedic support device.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A cane fitted with retractable strut legs that are each pivotally joined to a lower section of the cane, said struts each fitted with pivotable brace means that extend the strut legs away from the lower section of the cane, when the bottom tip of the cane is pressed against a surface by the user, together with spring means that bias each strut to retract towards the cane, said bottom tip of the cane fixed to a member slidably telescopically extending from the said lower portion of the cane, and linked to said brace means.

2. A cane fitted with retractable strut legs that are pivotably joined to the cane, said struts each fitted with brace means that extend the strut legs away from the cane when the cane is pressed against a surface by the user, together with spring means that bias each strut to retract towards the cane, in which the said cane comprises a handle fixed to a first end of a tube, said tube formed with a hollow axial chamber extending from the second end of said tube, a piston member slidably mounted in said chamber and spring biased to extend a tip of the piston beyond the said second end of the tube, a plurality of leg struts individually pivoted to the tube and located so that each strut extends beyond the said second end of the tube when the strut is folded adjacent to the tube, with the tip of said piston member extending a greater distance from the tube end in said folded position, together with said brace means comprising brace members each pivotably fastened to a strut and to the piston member, with each brace member extending through a slot in the tube.

* * * * *